W. F. FOLMER.
FILM SPOOL CENTER.
APPLICATION FILED DEC. 9, 1911.
1,065,601.
Patented June 24, 1913.
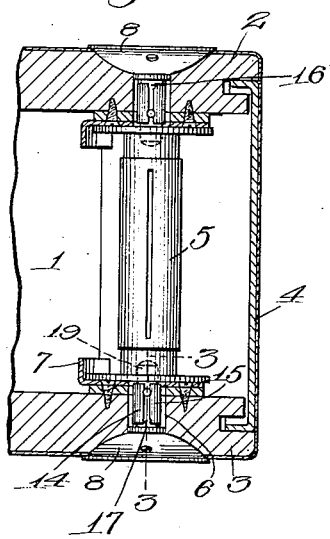
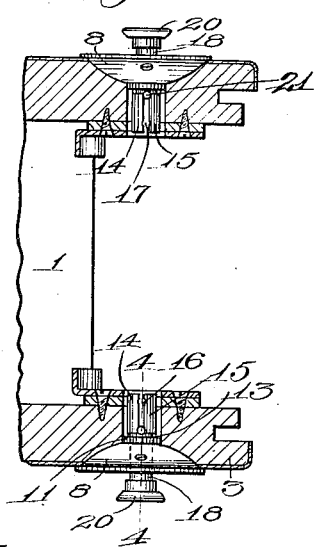
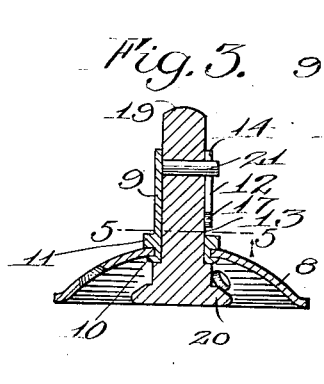
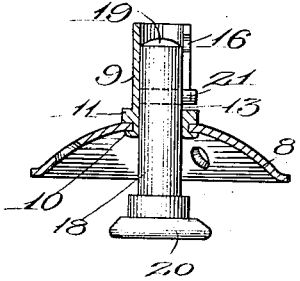
Witnesses
Nelson H. Copp
Walter B. Payne
Inventor
WILLIAM F. FOLMER
By Chuck Ruh
his Attorneys

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

FILM-SPOOL CENTER.

1,065,601.  Specification of Letters Patent.  Patented June 24, 1913.

Application filed December 9, 1911. Serial No. 664,730.

*To all whom it may concern:*

Be it known that I, WILLIAM F. FOLMER, of Rochester, in the county of Monroe and State of New York, have invented certain new and useful Improvements in Film-Spool Centers; and I do hereby declare the following to be a full, clear, and exact description of the same, reference being had to the accompanying drawings, forming a part of this specification, and to the reference-numerals marked thereon.

My present invention relates to photography, and more particularly to photographic film cameras or roll holders, and it has for its object to provide a simple, cheap and convenient means for centering or journaling the spool within the film chamber, the improvements being directed in part toward so constructing the center that it will be automatically retained in both its inward and outward positions whereby the necessity of simultaneously manipulating the centers at the time a spool is being inserted or removed is obviated.
Simplicity both in manufacture and in assembling is a further object of the invention, and to these and other ends the invention consists in certain improvements and combinations of parts, all as will be hereinafter more fully described, the novel features being pointed out in the claims at the end of the specification.

In the drawings: Figure 1 is a sectional view through the film chamber of a camera casing or roll holder, showing in side elevation a pair of spool centers, each constructed in accordance with and illustrating one embodiment of my invention, the centers being shown in their inward or opposite positions and the spool being shown in place thereon. Fig. 2 is a similar view with the centers retracted; Fig. 3 is a section taken substantially on the line 3—3 of Fig. 1; Fig. 4 is a section taken substantially on the line 4—4 of Fig. 2, and Fig. 5 is a transverse section taken substantially on the line 5—5 of Fig. 3.

Similar reference numerals throughout the several figures indicate the same parts.
Inasmuch as my present invention is more particularly, though not exclusively, applicable to the dead or non-rotative centers, I have illustrated it in connection with the film feeding chamber 1 of a camera or roll holder, having the upper and lower walls 2 and 3 inclosing the chamber, which latter is accessible through a suitable door or back 4. The centers at each end of the spool 5 may be alike in all respects, and a description of one will, therefore, suffice for both.

An aperture 6 in the chamber walls 2, 3 is, in the present instance, surrounded by a cradle 7 that assists in alining the recesses in the ends of the film spool, which latter may be of the usual construction, with the centers about to be described. A socket piece is provided comprising a preferably concave or dished mounting plate 8, that is set in to the wall 2—3 on the exterior, and a tubular portion 9 riveted at 10 with the aid of a shoulder 11 to the mounting plate 8, which tubular portion projects through the aperture 6 to the film chamber. The tube 9 is provided with a longitudinal slot 12 and with a transverse slot 13 intersecting the latter at or near the base of the tube, so as to provide two resilient or laterally yieldable jaws 14 and 15. The adjacent faces of these jaws, constituted by the walls of the longitudinal slot 12, are provided with oppositely arranged pairs of recesses 16 and 17, spaced from each other longitudinally and forming abutments or shoulders.

Slidably movable longitudinally within the socket piece and more particularly the tubular portion 9 thereof, is a stem 18, which may be of the regular cylindrical form, its inner end 19 constituting the center proper that engages with and forms the journal for the recess in the spool end, while at its outer or opposite end is formed a finger portion 20 that is readily accessible to the fingers of the operator at all times because of the beforementioned concave nature of the mounting plate 8. The stem is provided with a laterally projecting pin or abutment 21 that occupies the slot 12 in the socket piece and traverses the same as the stem moves longitudinally between the inward or operative position of Figs. 1 and 3, in which it engages the spool and the retracted position of Figs. 2 and 4 that releases the spool. The resilient or spring jaws 14 and 15 frictionally engage the pin between them though not with sufficient pressure to interfere greatly with the longitudinal movement of the stem, but when the latter reaches either of its two mentioned positions the pin automatically snaps into the recessed portions 16 or 17, and coöperates with the abutments formed thereby to maintain the stem in that position.

When it is desired to change the position of the stem a slightly greater pressure exerted thereon will cause the jaws to yield laterally and allow the pin 21 to ride out of the depressions, the jaws closing together again when the other pair of depressions is reached. Thus the centers are definitely held in either position and when retracted they maintain themselves so that the operator is free to devote his entire attention to the manipulation of the spool when loading or unloading instead of being obliged to retain a grip on the stems during this process, as is required with some of the spring pressed centers heretofore used.

It will be observed that a center constructed in accordance with the present invention is simple mechanically embodying practically only two parts, and may be easily assembled with the camera or roll holder by insertion from the exterior thereof after the hole 6 and the seat of the mounting plate 8 have been bored.

I claim as my invention:

1. In a film spool center, the combination with a socket member embodying a tube having a longitudinal slot therein provided with a recess in one of its walls, of a stem movable longitudinally within the tube between an inward spool engaging position and a retracted position, and a projection on the stem adapted to traverse the slot in the tube and to yieldingly engage in a direction laterally of the slot with the recess in the wall thereof, one of said engaging parts being resiliently mounted.

2. In a film spool center, the combination with a socket member embodying a resilient tube having a longitudinal slot therein provided with a recess and a transverse slot at one end thereof forming a resilient recessed jaw, of a stem movable longitudinally within the socket between an inward spool engaging position and a retracted position and a projection on the stem adapted to traverse the slot in the tube in contact with the resilient jaw and to be yieldingly engaged by the recess therein to maintain the stem in one of its positions.

3. In a film spool center, the combination with a socket piece embodying a mounting plate and a tube secured therein at one end provided with a longitudinal slot and a transverse slot at the base thereof forming resilient jaws, said jaws being provided with oppositely arranged pairs of recesses, of a stem movable longitudinally within the tube between an inward spool engaging position and a retracted position and a pin on the stem adapted to traverse the slot between the jaws and to be yieldingly engaged by the respective pairs of recesses to maintain the stem in its respective positions.

WILLIAM F. FOLMER.

Witnesses:
F. F. Church,
Florence E. Franck.